(12) United States Patent
Park (10) Patent No.: US 7,157,648 B2
(45) Date of Patent: Jan. 2, 2007

(54) SLIDING MODULE FOR PORTABLE TERMINAL

(75) Inventor: Joseph Juseop Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/338,046

(22) Filed: Jan. 24, 2006

(65) Prior Publication Data

US 2006/0258413 A1 Nov. 16, 2006

(30) Foreign Application Priority Data

Mar. 14, 2005 (KR) .................. 10-2005-0021054

(51) Int. Cl.
*H02G 3/04* (2006.01)
(52) U.S. Cl. .................. 174/481; 174/50; 174/500; 174/17 R; 361/727; 379/679
(58) Field of Classification Search .................. 174/50, 174/17 R, 489, 500, 66, 67; 220/241, 242, 220/3.8, 4.02; 361/727, 679–681; 379/428.01, 379/433.01, 433.12, 440
See application file for complete search history.

(56) References Cited

U.S. PATENT DOCUMENTS

| 6,822,871 | B1 * | 11/2004 | Lee et al. ................... 361/727 |
| 6,826,056 | B1 * | 11/2004 | Tsuyuki et al. ............. 361/725 |
| 6,847,806 | B1 * | 1/2005 | Curtis et al. ................ 455/90.3 |
| 7,002,073 | B1 * | 2/2006 | Lai et al. ...................... 174/50 |
| 7,031,152 | B1 * | 4/2006 | Tsai et al. .................... 361/685 |
| 7,057,904 | B1 * | 6/2006 | Bundza et al. .............. 361/801 |
| 7,092,520 | B1 * | 8/2006 | Fuhrmann et al. ..... 379/433.11 |

* cited by examiner

*Primary Examiner*—Dhiru R. Patel
(74) *Attorney, Agent, or Firm*—The Farrell Law Firm (57) ABSTRACT

A sliding module employing a semi-automatic opening/closing of the portable terminal, is disclosed. A driving force is used to open and close the sliding-type portable terminal with the resilient force of an elastic means, by converting the direction of the driving force by means of sliders formed on a sliding guide and a sliding plate, respectively. Thus, a user can conveniently manipulate the sliding-type portable terminal.

7 Claims, 10 Drawing Sheets

SLIDING MODULE FOR PORTABLE TERMINAL

PRIORITY

This application claims priority to an application entitled "Sliding Module For Portable Terminal" filed in the Korean Industrial Property Office on Mar. 14, 2005 and assigned Serial No. 2005-21054, the contents of which are incorporated herein by reference.

BACKGROUND OF THE INVENTION

1. Field of the Invention

The present invention relates to a portable terminal, and more particularly to a sliding module for a sliding-type portable terminal, wherein a pair of housings are coupled in a manner such that they can slide in a longitudinal direction in order to open or close in a sliding motion.

2. Description of the Related Art

In general, current conventional portable terminals may be classified into various types according to their appearance, such as bar-type portable terminals, flip-type portable terminals and folder-type portable terminals.

The bar-type portable terminal has a single main housing, which is provided with a data input/output device, a transceiver unit and a receiver unit. This type is limited with regard to compactness, which results from constant exposure of the keypad, i.e., a data input means, as well as ensuring a sufficient distance between the transceiver unit and the receiver unit.

The flip-type portable terminal includes a body, a flip and a hinge device which pivotably connects the body to the flip. The body is provided with a data input/output device, a transceiver unit and a receiver unit. The flip opens or closes the key pad (i.e. data input means), thereby preventing a malfunction of the portable terminal. However, the flip-type portable terminal is also limited in compactness due to ensuring the distance between the transceiver unit and the receiver unit.

The folder-type portable terminal has a body, a folder, and a hinge device, which pivotably connect the body with the flip, and the folder can open/close by pivoting. This type is advantageous in compactness since the malfunction of a keypad can be avoided in a telephone call standby mode, i.e., when the folder is closely contacted to the body, and the folder can sufficiently ensure a distance between the transceiver unit and the receiver unit in a telephone call mode. This has led to such folder-type portable terminals being widely used as a main portable terminal.

With diversification of the designs of portable terminals, however, a sliding-type portable terminal, wherein a pair of housings are coupled in a manner that they can slide to be opened/closed through sliding motions, have been developed and commercialized. The sliding-type portable terminal is advantageous in compactness as well as in portability, which corresponds with that of the folder-type portable terminal. As a result, the sliding-type portable terminal is expected to make great inroads into the market occupied by the folder-type portable terminal.

U.S. Pat. No. 6,822,871, commonly assigned to the Assignee of the present invention and issued on Nov. 23, 2004, discloses a construction of such a sliding-type portable terminal. Since the sliding-type portable terminal described therein utilizes a sliding module with torsion springs, it performs a semi-automatic sliding motion. In particular, when a pair of housings are coupled in a manner that they can slide along each other, either one of two housings starts to be slid by user's manipulation in one section. Thereafter, the other housing is automatically slid by the driving force of the torsion spring in the other section.

However, the conventional sliding-type portable terminal is a sliding module, which utilizes a driving force of the torsion spring. Therefore, when the driving force for opening/closing the portable terminal is provided, there may exist a limitation with regard to compactness due to a problem in ensuring a space for the movement of the torsion springs. In particular, in order to ensure the space for the movement of the torsion springs, there is great restriction to reduce the width of the sliding module and that of the portable terminal.

SUMMARY OF THE INVENTION

An object of the present invention is to provide a sliding module with a reduced width, so as to realize the compactness of a portable terminal.

In order to accomplish this objective, there is provided a sliding module for a sliding-type portable terminal, in which a pair of housings are coupled in a manner in which they can slide along a longitudinal direction, the sliding module including a sliding guide attached to either one of the pair of housings, a sliding plate attached to the other one of the pair of housings and slidably engaged with the sliding guide, and first and second sliders interposed between the sliding guide and the sliding plate and adapted to reciprocate along the direction of movement of the sliding plate by resilient force and oriented to face away from each other, wherein a first guiding projection formed on the sliding guide supports the second slider and a second guiding projection formed on the sliding plate supports the first slider in a first position in which the sliding plate slides under the sliding guide, and a third guide projection formed on the sliding guide supports the first slider and a fourth guide projection formed on the sliding plate supports the second slider in a second position in which the sliding plate slides above the sliding guide.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. Further, in the following description of the present invention, a detailed description of known functions and configurations incorporated herein will be omitted for the sake of clarity.

Figure 1:
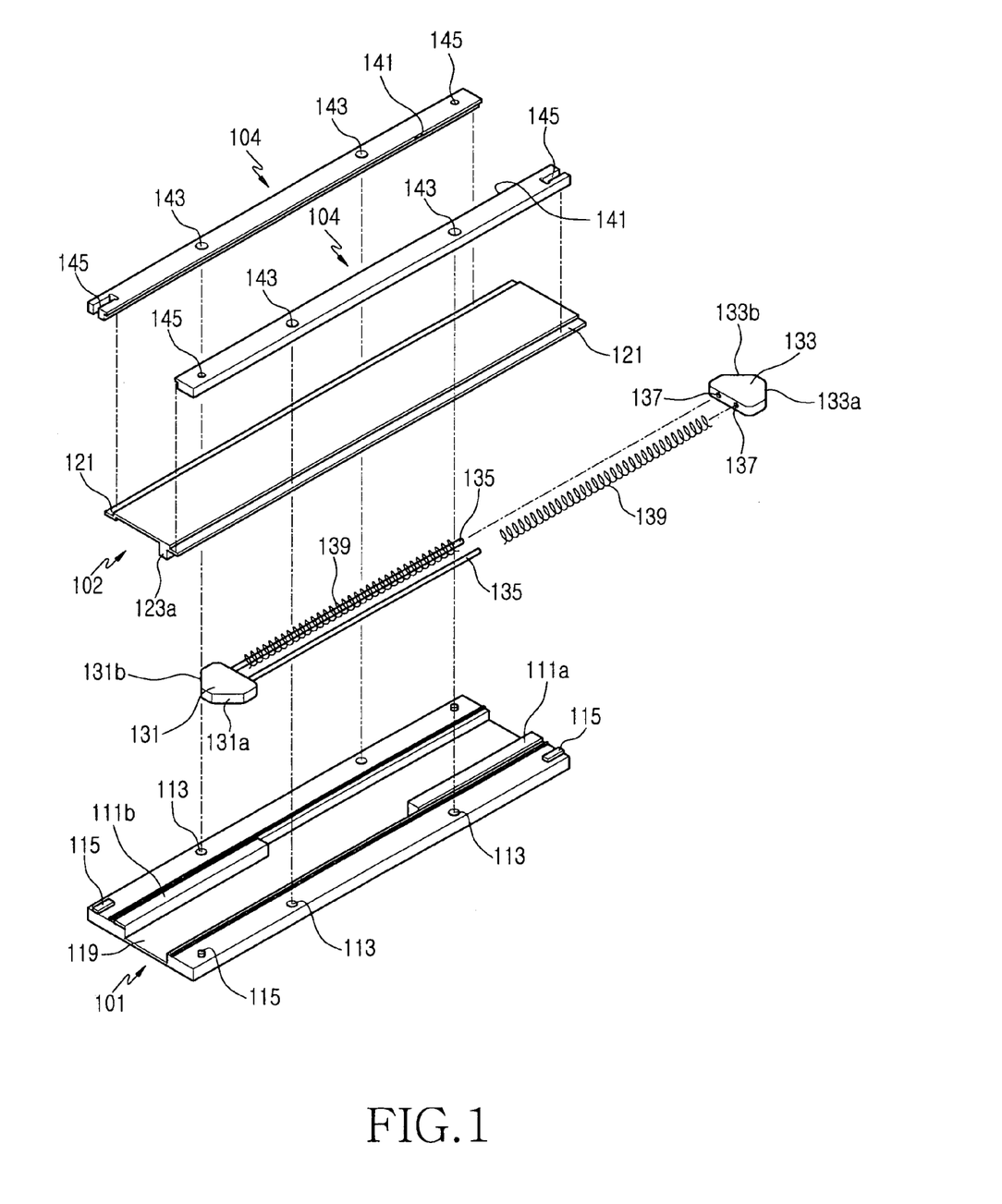
FIG. 1 is an exploded perspective view showing a sliding module for portable terminals according to a preferred embodiment of the present invention.

FIG. 1 is an exploded perspective view showing a sliding module 100 for a portable terminal according to a preferred embodiment of the present invention. The sliding module 100 includes a sliding guide 101, a sliding plate 102, a first and second sliders 131, 133, and elastic means 139, and couples a pair of housings in a manner that they can slide while facing away from each other.

The sliding guide 101 is attached to either one of the pair of housings including the portable terminal. In consideration of the structural property and material of the housings including the sliding guide 101 and the portable terminal, the sliding guide 101 and the housings can be coupled by means of one of the methods selected by those skilled in the art, such as a screw clamping, an ultrasonic welding or an adhesives bonding.

The front side of the sliding guide 101 is provided with a sliding recess 119 extending upward and downward. The sliding recess 119 provides a space to accommodate the sliders 131, 133. The sliding recess 119 is formed with opposing inner walls that include first and third guide projections 111a, 111b, respectively. The first guide projection 111a and the third guide projection 111b are separated from each other by a constant distance in the width direction of the sliding guide 101.

The sliding guide 101 is formed with clamping holes 113 placed along either side of its front surface, and clamping projections 115 on either end thereof. The clamping holes 113 and clamping projections 115 provide a means for connecting clamping holders 104 in order to prevent the sliding plate 102 from releasing from the sliding guide 101 while the sliding plate 102 is clamped on the sliding guide 101.

The sliding plate 102 is attached to the other one of the pair of housings including the portable terminal. In consideration of the structural property and material of the housings including the portable terminal, as well as the sliding guide 101, the sliding plate 102 and the housings can be coupled by means of one of the methods selected by those skilled in the art, such as a screw clamping, an ultrasound welding or an adhesives bonding, etc. The sliding guide 101 and the sliding plate 102 of the sliding module 100 according to a preferred embodiment of the present invention are composed of a metal material, such as SUS (steel use stainless). Since the housings for the portable terminals are made of a synthetic resin, it would be preferable to couple the sliding module 100 with the housings for the portable terminal by screws.

The sliding plate 102 is coupled with the sliding guide 101 in a manner in which it can longitudinally slide while being attached to a housing including the portable terminal. Therefore, the pair of housings including the portable terminal are coupled in a manner that they can slide, via the sliding guide 101 and the sliding plate 102.

Figure 2:
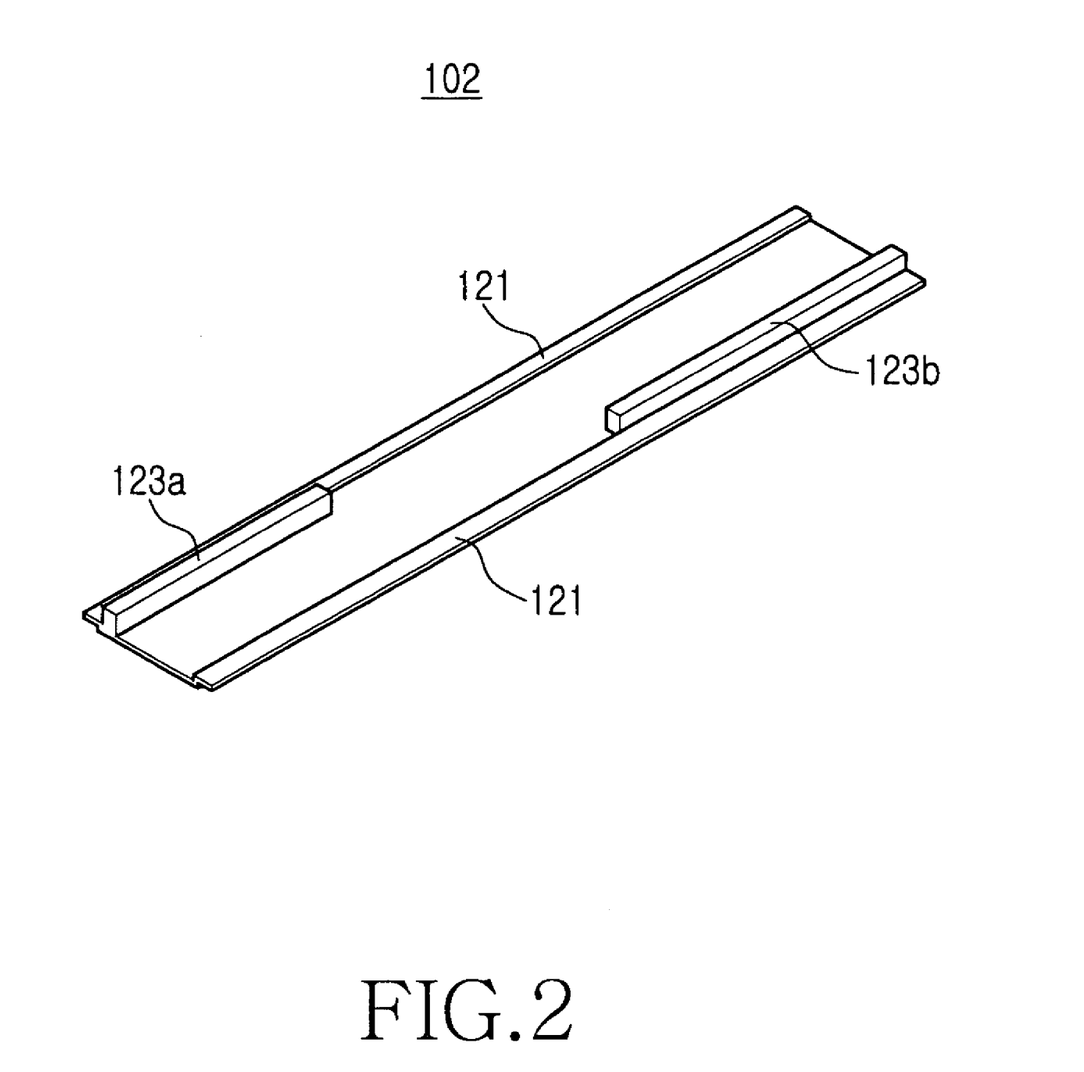
FIG. 2 is a perspective view of a sliding plate for the sliding module shown in FIG. 1.

Referring to FIG. 2, the sliding plate 102 is formed with, at the rear side thereof, a second guide projection 123a and a fourth guide projection 123b which extend longitudinally. The second guide projection 123a is positioned on the bottom end of the sliding plate 102, and the fourth guide projection 123b on the top end of the sliding plate 102.

When the sliding plate 102 is coupled with the sliding guide 101, the second guide projection 123a can be connected to one sidewall of the sliding recess 119, and aligned with the first guide projection 111a in a straight line, depending upon the moving direction of the sliding plate 102. Therefore, the second projection 123a moves closer to or away from the first guide projection 111a, according to the sliding plate 102 which slides along the sliding guide 101. At this time, when the sliding guide 101 moves in either direction and the end of the first guide projection 111a contacts the end of the second guide projection 123a, the sliding guide 101 can no longer move in the course along which it has traveled. In other words, the first guide projection 111a and the second guide projection 123a will serve as stoppers to restrict the motion of the sliding guide 101.

When the sliding plate 102 is coupled with the sliding guide 101, the fourth guide projection 123b can be connected to the other sidewall of the sliding recess 119, and aligned with the third guide projection 111b in a straight line, depending upon the moving direction of the sliding plate 102. Therefore, the forth projection 123b moves closer to or away from the third guide projection 111b, according to the sliding plate 102 which slides along the sliding guide 101. At this time, when the sliding guide 101 moves in the other direction and the end of the third guide projection 111b contacts the end of the forth guide projection 123a, the sliding guide 101 can no longer move in the course along which it has traveled. In other words, the third guide projection 111b and the fourth guide projection 123b will serve as stoppers to restrict the motion of the sliding guide 101.

Consequently, the first guide projection 11a and the fourth guide projection 123b, and the second guide projection 123a and the third guide projection 11b perform in relative linear motion while the inner walls thereof face each other, and the first guide projection 111a and the second guide projection 123a, and the third guide projection 111b and the forth guide projection 123b also move closer to or away from each other.

In order to prevent the sliding plate 102 from releasing from the sliding guide 101 during the sliding motions of the sliding guide 101, the sliding module 100 includes a pair of holders 104. Each of the holders 104 is clamped at opposite side ends of the sliding guide 101 to support the opposite side ends of the sliding plate 102 in a manner in which they can slide along each other.

The holders 104 have fixing holes 145 and clamping holes 143 for coupling the sliding plate 102 with the sliding guide 101. These fixing holes 145 are engaged with the fixing projections 115 formed on the sliding guide 101 and set up the locations to which the holders 104 are fixed, respectively. As a result, the holders 104 can be fixed to the sliding guide 101 by means of securing screws into the clamping holes 143, which are formed on both the sliding guide 101 and holders 104, respectively.

In order to support the sliding motions of the sliding plate 102, the holder 104 has first guide ribs 141 longitudinally extending on the inner side ends thereof, respectively. When the holders 104 are coupled with the sliding guide 101, the first guide ribs 141 maintain a constant distance apart from the front surface of the sliding guide 101.

The sliding plate 102 is provided with, at opposite ends thereof, second guide ribs 121, respectively. The second guide ribs 121 are interposed between the front surface of the sliding guide 101 and the first guide ribs 141 so as to guide the sliding motions of the sliding plate 102. However, if the opposite ends of the sliding plate 102 can interpose between the front surface of the sliding guide 101 and the first guide ribs 141, respectively, it is unnecessary to provide the second guide ribs 121.

In this case, by supporting the holders 104 on opposite side ends of the sliding plate 102, respectively, it will prevent the sliding plate 102 from releasing out of the sliding guide 101.

The first and second sliders 131 and 133 are received within the sliding recess 119 in a matter that they can slide, respectively.

Figure 3:
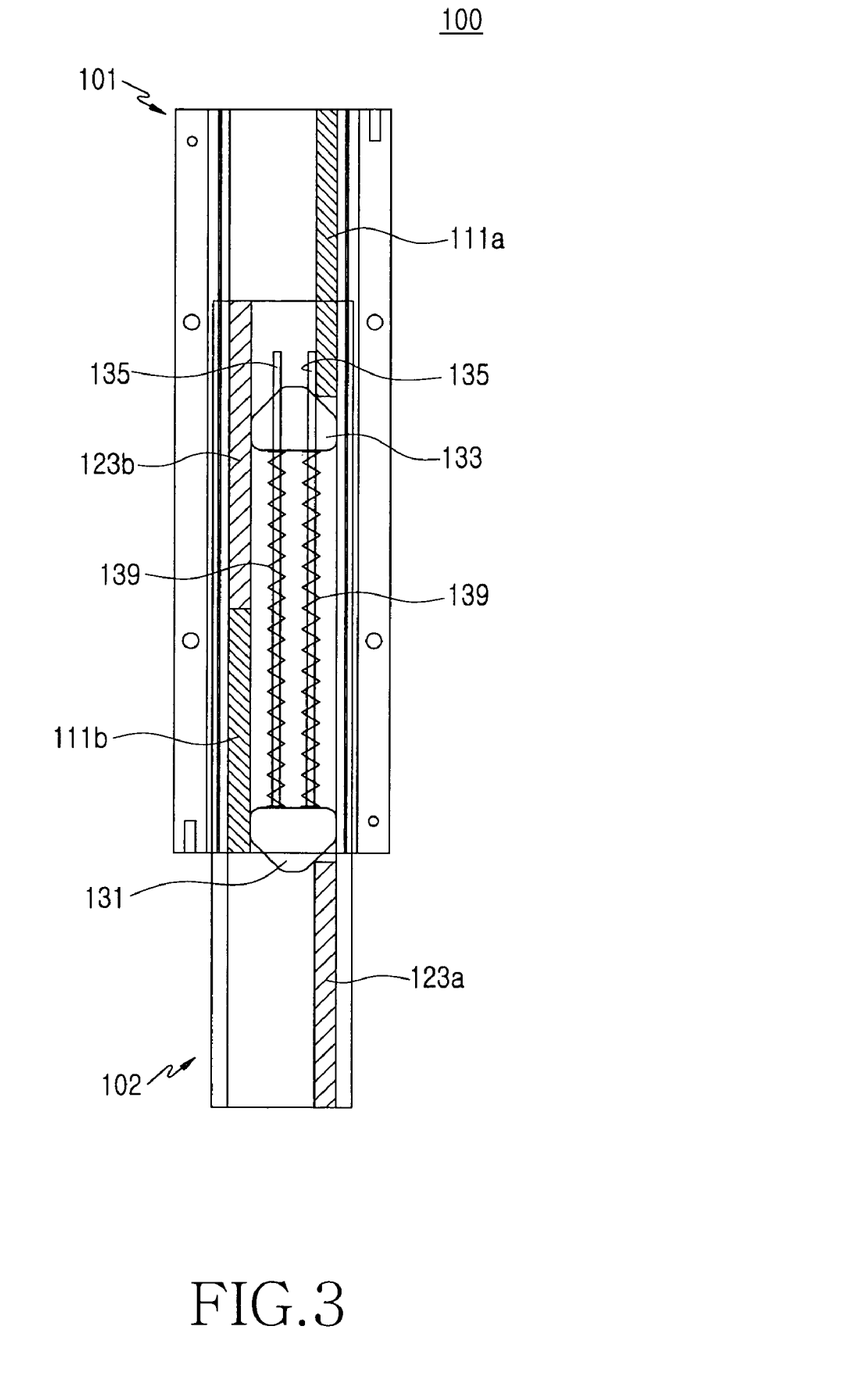
FIGS. 3 to 5 are views that illustrate the operation of the sliding module shown in FIG. 1.
Figure 4:
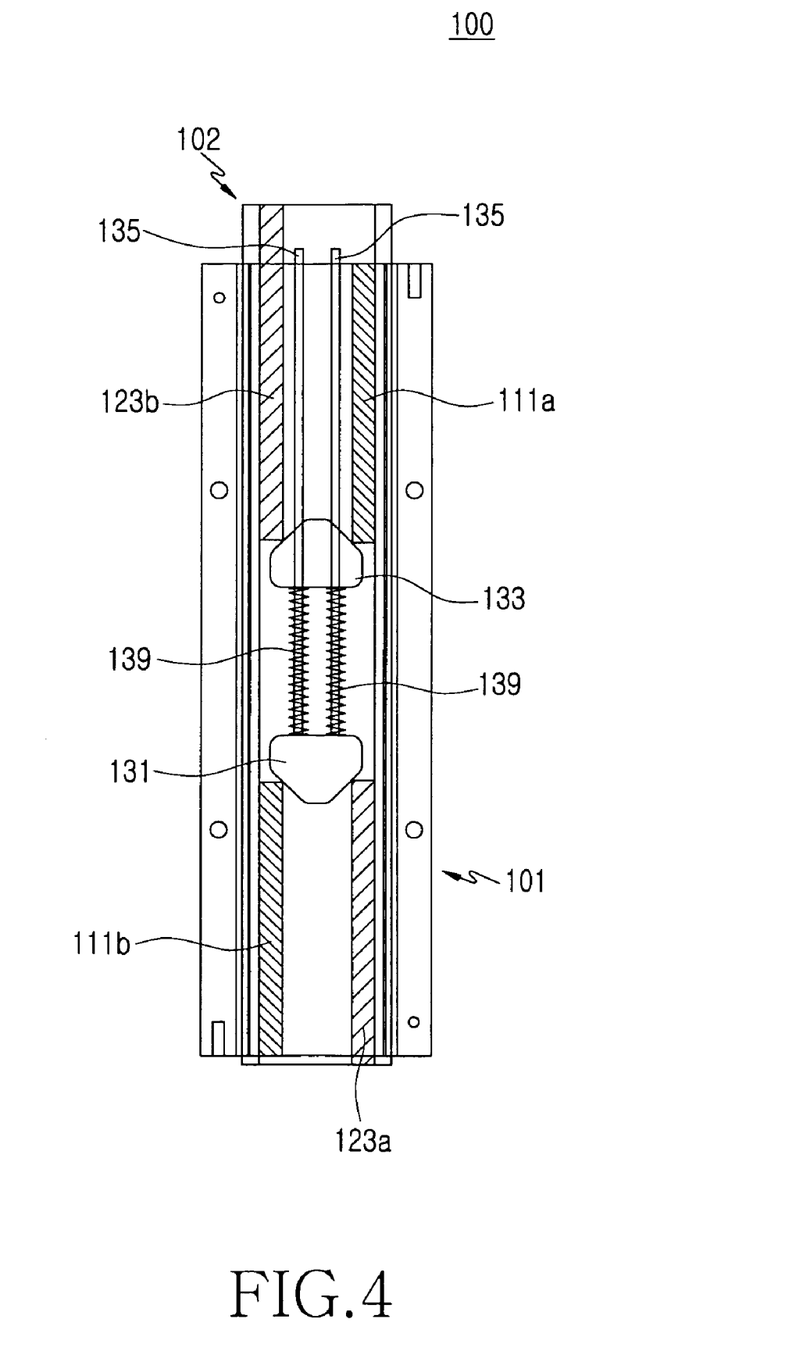
Figure 5:
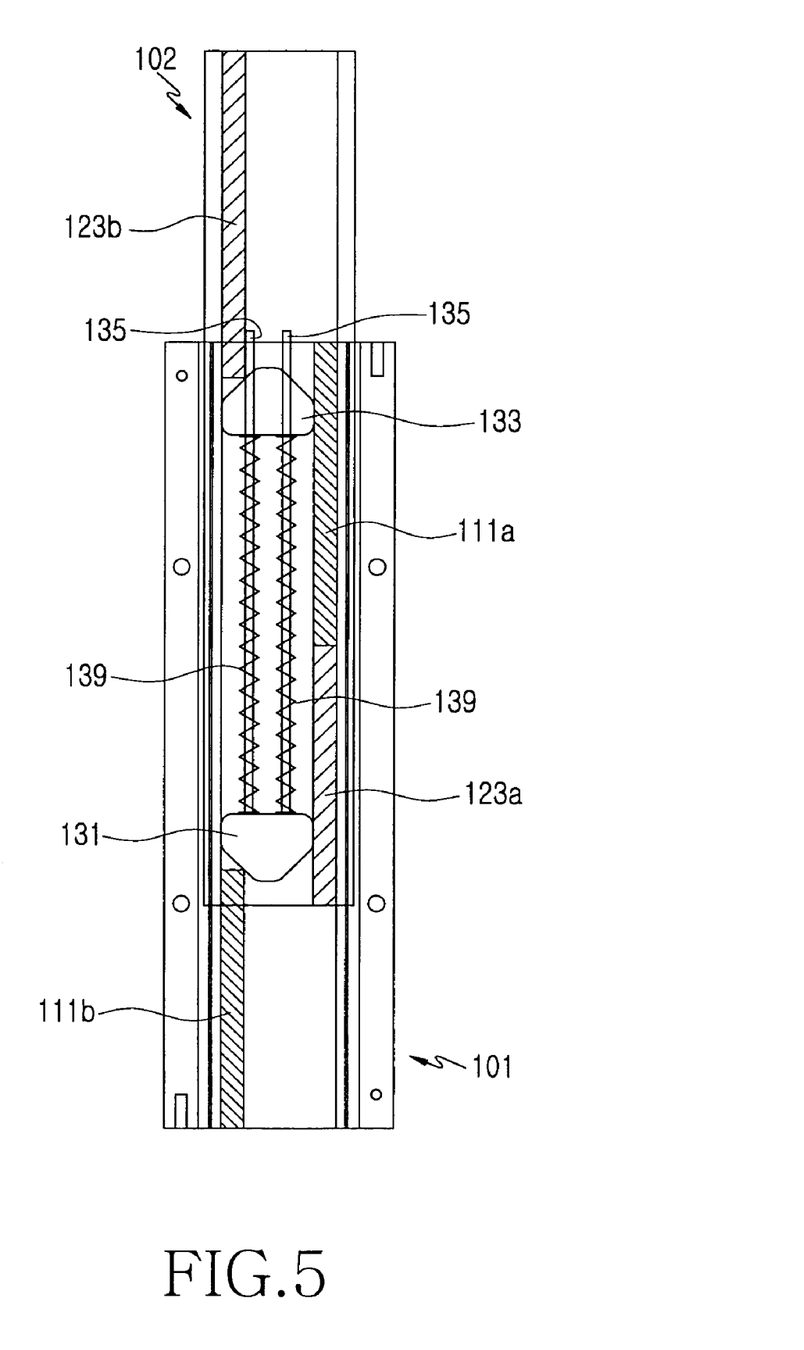

As shown in FIG. 1, the first slider 131 is positioned on the bottom of the sliding recess 119, and the second slider 133 on the top side thereof, respectively, and they can slide closer to or away from each other. The sliders 131 and 133 have a rectangular shape, with slant surfaces 131a, 131b, and 133a, 133b being formed at respective ends of sliders 131 and 133. As shown in FIGS. 3 to 5, as the sliding plate 102 slides, the slant surfaces 131a, 131b and 133a, 133b are interfered with one of the first to the fourth guide projections 111a, 111b and 123a, 123b. Since the sliders 131 and 133 slide within the sliding recess 119, it is preferable to design the corners in a rounded fashion.

An elastic means 139 is interposed between the first slider 131 and the second slider 133 so that a resilient force, which acts outward on the sliders 131 and 133, will be supplied. A compression coil spring is suitable for the elastic means 139.

Either one of the sliders 131 and 133 has at least one guide rod 135 which longitudinally extends from the surface facing with the other slider, and the other slider is provided with guide holes 137 through which the guide rods 135 can pass. According to the preferred embodiment, the guide rods 135 are adapted to be one pair, which extend from the first slider 131, and the guide holes 137 is formed on the second slider 133.

The guide rods 135 allow the sliders 131 and 133 to be moved through the relative sliding motions while being aligned with each other in a straight line. The elastic means 139, particularly the compression coil spring, are supported, at opposite ends thereof, by the first slider 131 and the second slider 133, respectively, while they are wound around the outer periphery of the guide rods 135.

FIGS. 3 to 5 are views illustrating the operation of the sliding module 100 shown in FIG. 1. A first section is defined by the state shown in FIG. 3 wherein the sliding plate 102 is positioned at the bottom of the sliding guide 101, to the state shown in FIG. 4 wherein the resilient force accumulated at the elastic means 139 is maximum after the top end of the sliding plate 102 has been moved out of the sliding guide 101. A second section is defined by the state shown in FIG. 4 wherein the resilient force accumulated at the elastic means 139 is maximum, to the state shown in FIG. 5 wherein the sliding plate 102 is positioned at the top of the sliding guide 101.

FIG. 3 illustrates the state in which the sliding plate 102 is positioned at the bottom end of the sliding guide 101. The sliders 131 and 133 are not only supported by the first guide projection 111a and the second guide projection 123a, respectively, but also slidably contact the inner walls of the third and fourth guide projections 111b and 123b. Also, since the resilient force of the elastic means 139 acts on the sliders 131 and 133 in the direction that urges them away from each other, and the sliders 131 and 133 are supported by the first guide projection 111a and the second guide projection 123a, respectively, the sliding plate 102 will be subjected to a driving force, which is adapted to move in the direction toward the bottom of the sliding guide 101. At this time, an end of the third guide projection 111b and that of the forth guide projection 123b contact each other, so that the sliding plate 102 can no longer move in the direction of the bottom of the sliding guide 101, despite the resilient force of the elastic means 139.

When the sliding plate 102 moves upward from the state shown in FIG. 3 by means of the external force, the first slider 131 can move upward along the sliding recess 119 by the second guide projection 123a. At this time, the slant surface 131a formed on the end of the first slider 131 will be supported by the second guide projection 123a. Therefore, by the resilient force of the elastic means 139 and the interference between the slant surface 131a and the second guide projection 123a, the first slider 131 can perform the sliding motions while rubbing against the inner walls of the third guide projection 111b.

On the other hand, the slant surface 133a formed on the end of the second slider 133 will be supported by the first guide projection 111a, resulting in a restriction of the second slider 133. Thus, the second slider 133 rubs against the inner walls of the fourth guide projection 123b by the resilient force of the elastic means 139 and the interference between the first guide projection 111a and the second slider 133.

In the first section mentioned above, the resilient force will gradually accumulate in the elastic means 139 while the sliding plate 102 moves upward.

As shown in FIG. 4, the sliders 131 and 133 are simultaneously supported by the second and third guide projections 123a and 111b, and the first and fourth guide projections 111a and 123b, respectively. At this time, the external force, which urges the sliding plate 102 upward, continues to act.

Thus, in the state shown in FIG. 4, the resilient force of the elastic means 139 acts to move the sliding plate 102 upward and downward, simultaneously. Since the external force acts to move the sliding plate 102 upward, the resilient force of the elastic means 139 acts on as a driving force, which moves the sliding plate 102 upward to the second section.

The first slider 131 is not only supported by the third guide projection 111b but also is in slidable contact the inner walls of the second guide projection 123a. Concurrently, the second slider 133 is not only supported by the fourth guide projection 111b but also is in slidable contact with the inner walls of the first guide projection 111a.

FIG. 5 shows the sliding plate 102 after being moved upward. Here, the sliders 131 and 133 are supported by respective ends of the third and the fourth guide projections 111b and 123b, while ends of the first and second guide projections 111a and 123b are in contact with each other such that further upward motion of the sliding plate 102 is restricted.

When the sliding plate 102 is returned to the first section from the second section, after moving downward in the second section by the external force acting on the sliding plate 102 which had been moved upward, the resilient force of the elastic means 139 acts as a driving force which moves the sliding plate 102 downward.

Consequently, in one respect the resilient force of the elastic means 139 acts as a driving force which moves the sliding plate 102 downward to the bottom of the sliding guide 101 at the first section, while in another respect the resilient force acts as a driving force which moves the sliding plate 102 upward to the sliding guide 101. This can be accomplished by converting the direction in which the resilient force of the elastic means 139 acts, with assistance of the guide projections 111a, 111b, 123a and 123b and the sliders 131 and 133.

Figure 6:
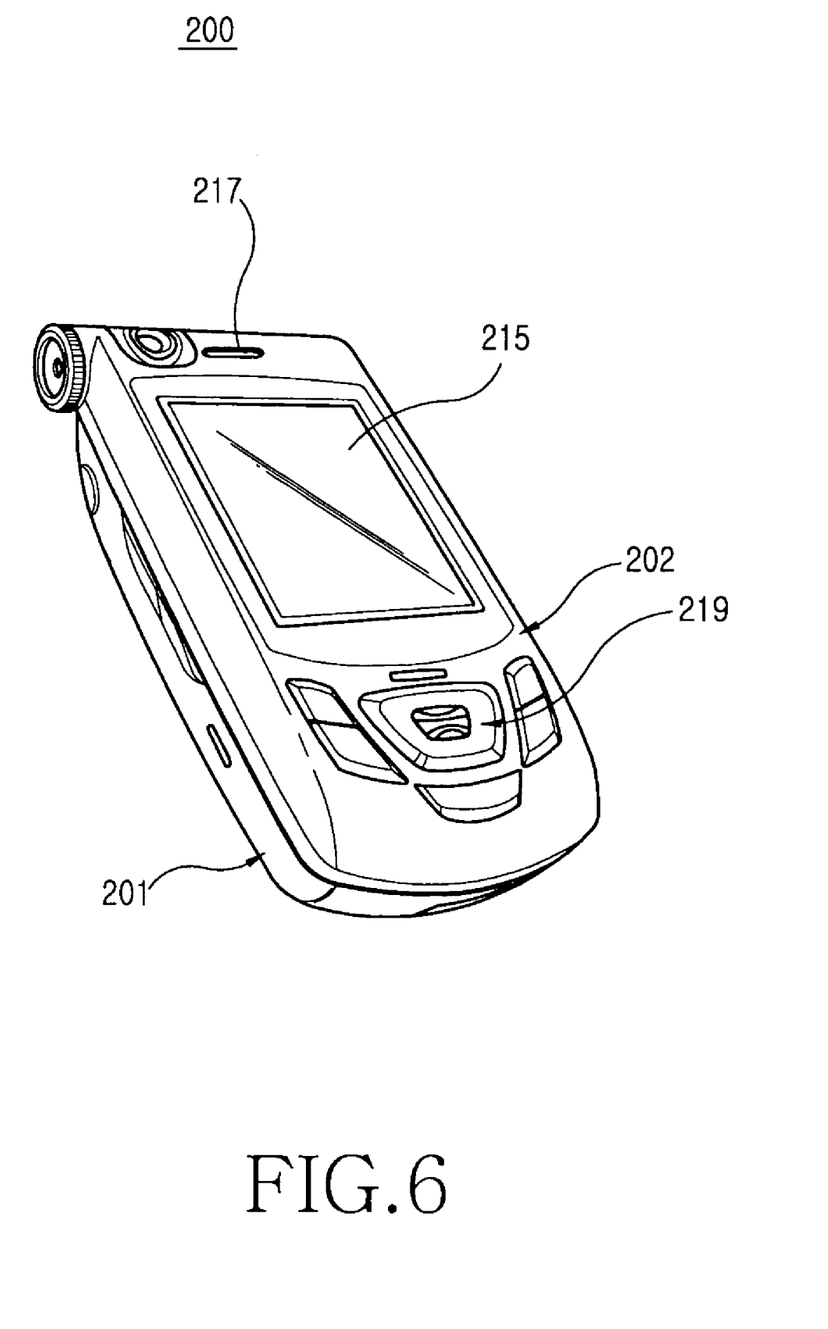
FIG. 6 is a perspective view showing a portable terminal having a sliding module shown in FIG. 1.
Figure 7:
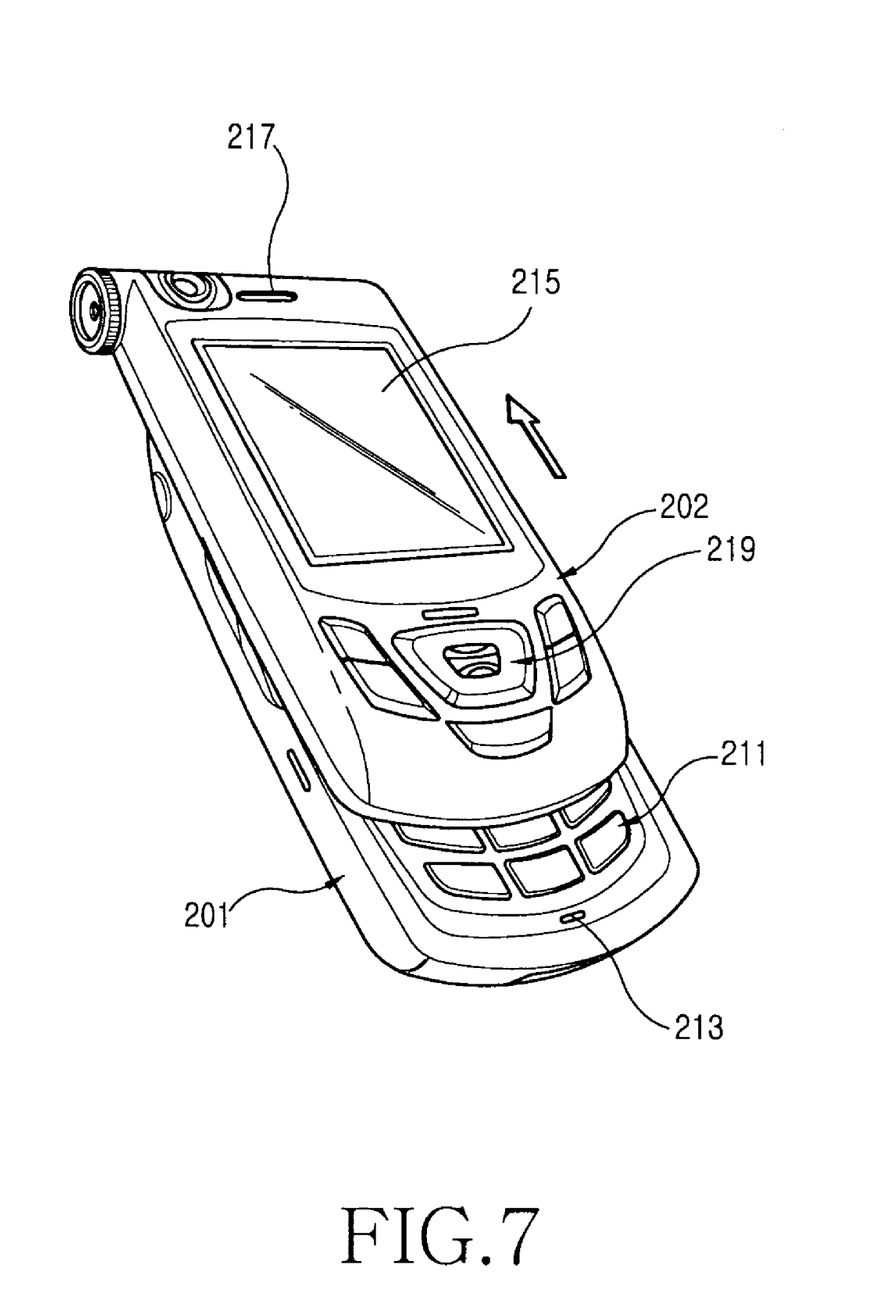
FIG. 7 is a perspective view showing the portable terminal shown in FIG. 6, when a second housing thereof is sliding.
Figure 8:
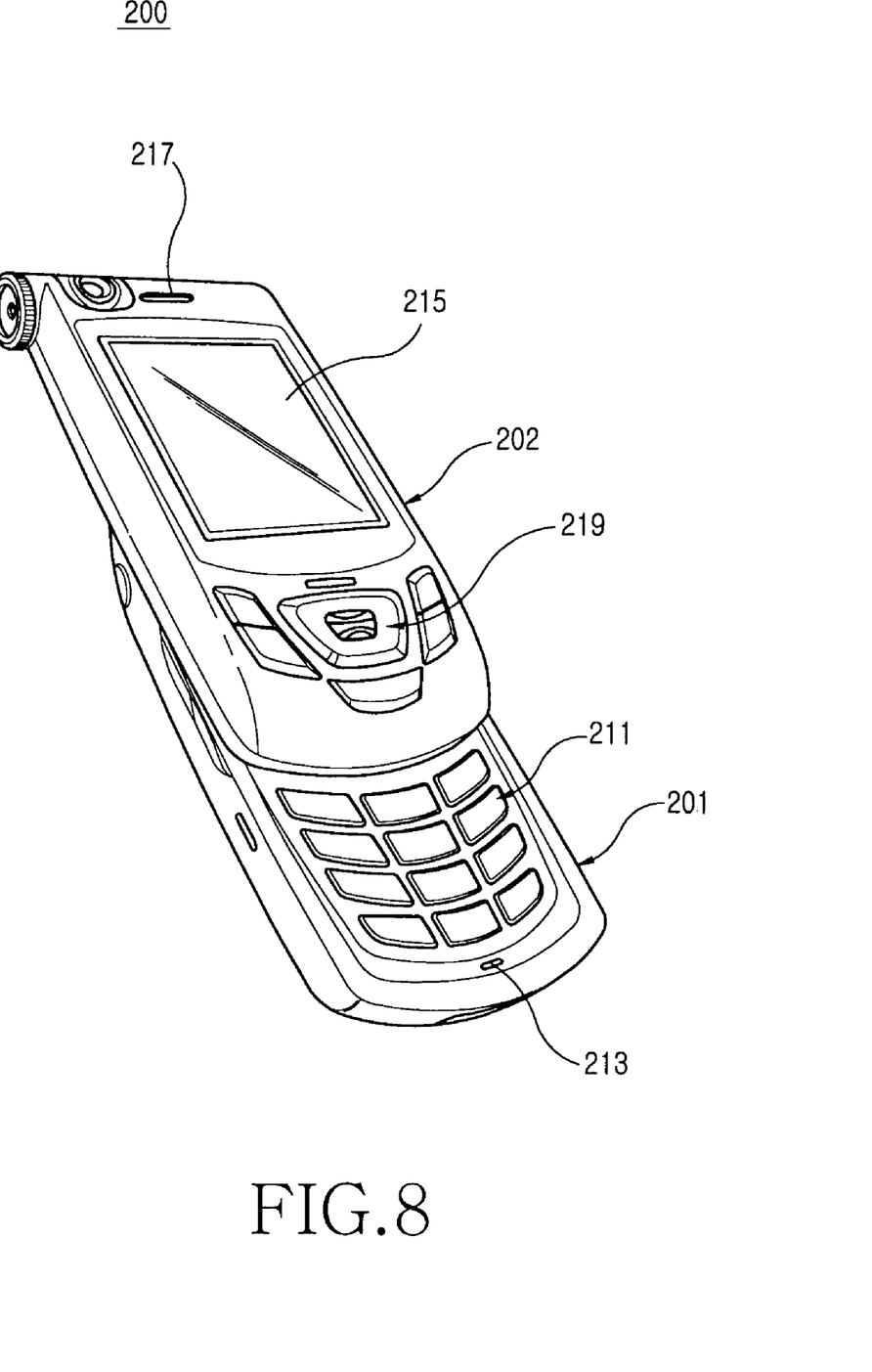
FIG. 8 is a perspective view showing the portable terminal shown in FIG. 6, when a second housing thereof has been slid.

FIGS. 6 to 8 are views illustrating the operation of a first embodiment of a portable terminal 200 having the sliding module 100 shown in FIG. 1.

The portable terminal 200 includes a first housing 201 having a keypad 211 and a transceiver unit 213, and a second housing 202 having at least a display unit 215, a functional keypad 219 and a receiver unit 217, the keypad 211 and the transceiver unit 213 are adapted to be opened/closed as the second housing 202 slides along the first housing 201.

The sliding guide 101 of the sliding module 100 is mounted on the front of the first housing 201, and the sliding plate 102 is mounted on the rear of the second housing 202.

FIG. 6 shows a state in which the second housing 202 has covered the keypad 211 and the transceiver unit 213. In this state, the sliding module 100 is positioned as shown in FIG. 3. When a user moves the second housing 202 upward, it gradually slides along the top of the first housing 201.

FIG. 7 shows a state in which the second housing 202 has exposed the keypad 211 and a portion of the transceiver unit 213. In this case, the sliding module 100 is positioned as shown in FIG. 4. Thus, the first section for the sliding module 100 is the state wherein the keypad 211 is completely covered, to the state wherein about a half of the keypad is exposed.

Until about a half of the keypad is exposed, the resilient force of the elastic means 139 acts by a driving force which urges the second housing 202 downward in direction that completely covers the keypad 211 and the transceiver unit 213.

When users further move the second housing 202 upward, the sliding plate 102 starts to enter into the second section, and the resilient force of the elastic means 139 converts into a driving force which urges the second housing 202 upward so as to completely expose the keypad 211. FIG. 8 is a view in which the keypad 211 has been completely opened. In this case, the sliding module 100 is positioned as shown in FIG. 5.

The keypad 211 and the transceiver unit 213 can be covered by simply moving the second housing 202 downward until the sliding plate 102 starts to enter into the first section from the second section. As result, the resilient force of the elastic means 139 converts a driving force which urges the sliding plate 102 upward into a driving force which urges it downward.

The sliding module 100 can be coupled to the portable terminal having a pair of housings in a manner such that they can slide in and a semi-automatic sliding motion. That is, after a force that acted to open or close the housings has been applied by a user's manipulation in one section, the portable terminal automatically opens or closes by the elastic means included in the sliding module in the other section.

Figure 9:
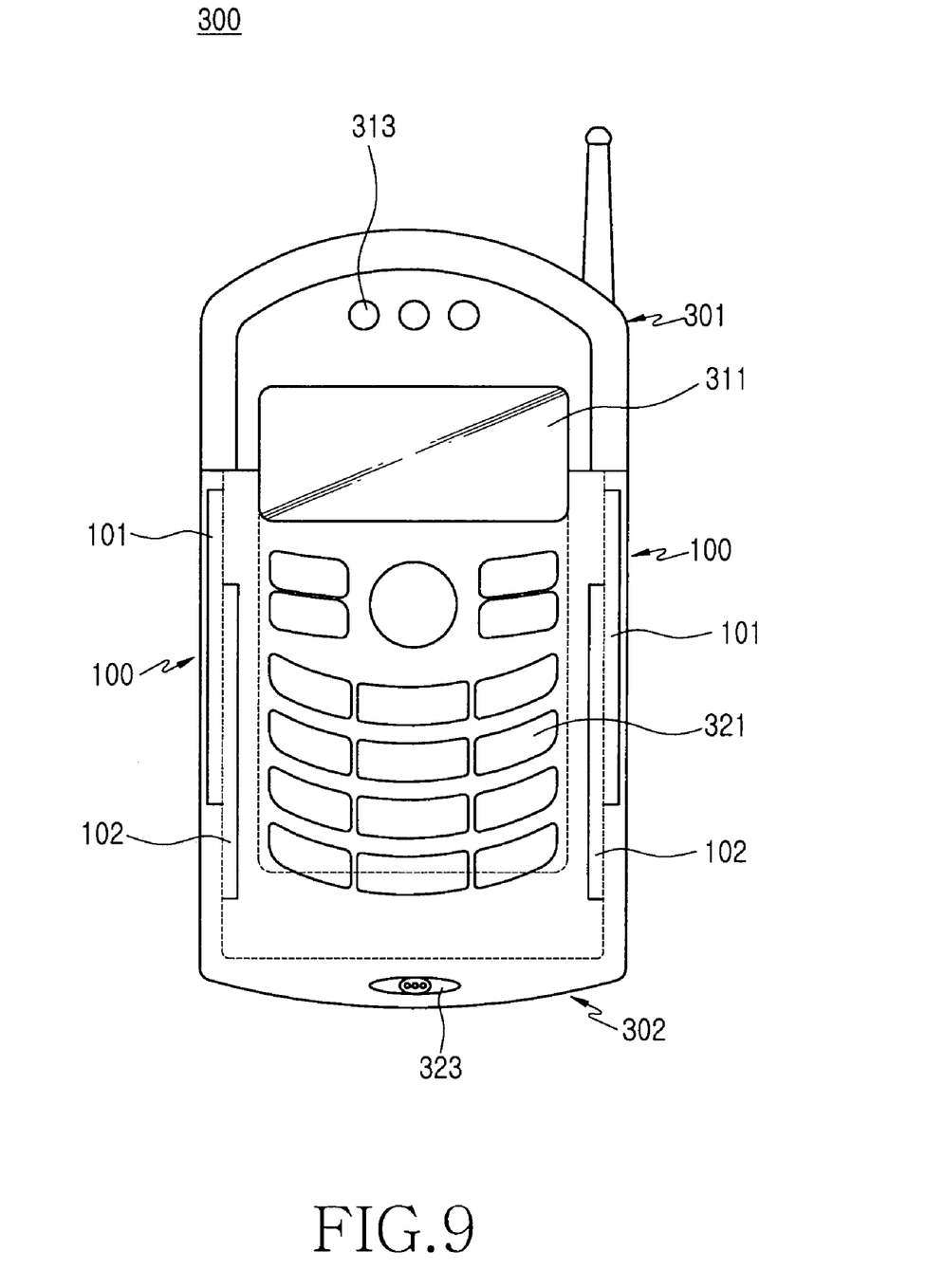
FIG. 9 is a front view showing a different portable terminal having the sliding module shown in FIG. 1.
Figure 10:
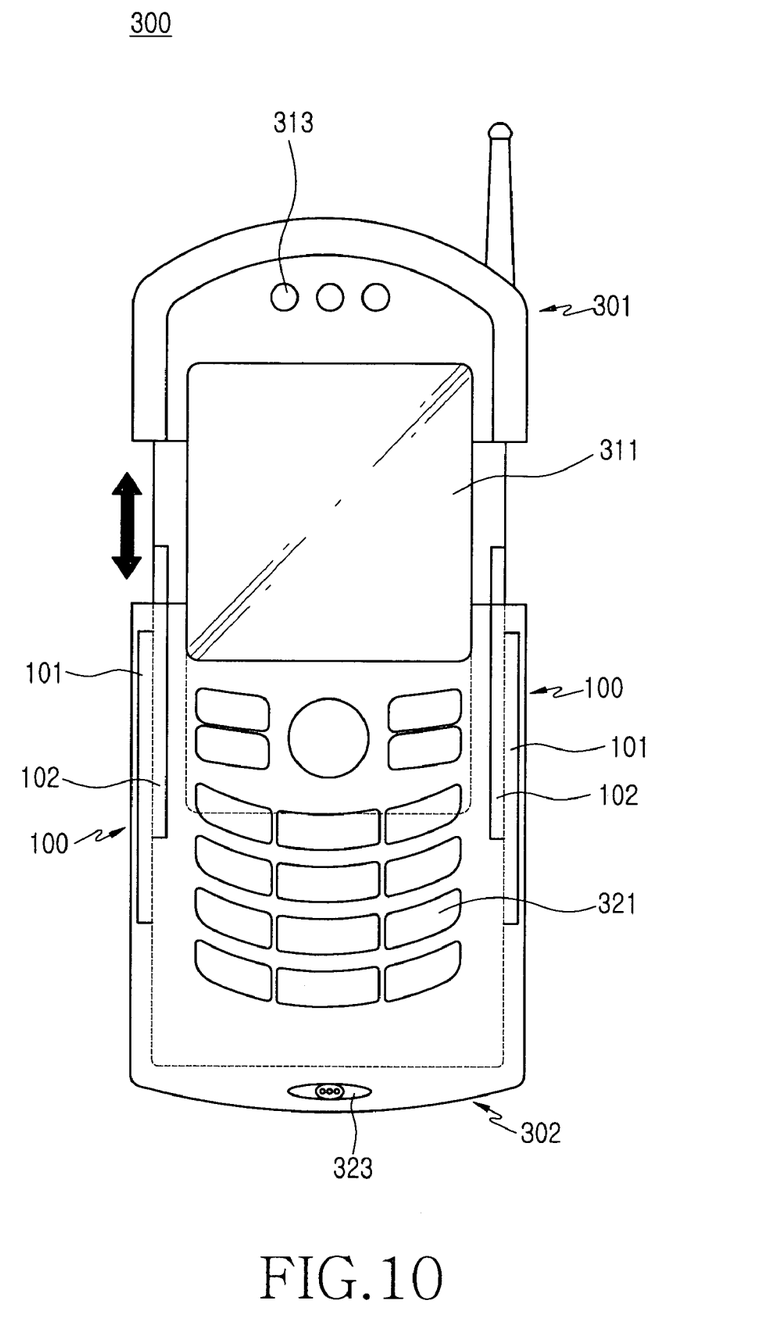
FIG. 10 is a front view showing the portable terminal shown in FIG. 9, when a second housing thereof has been slid.

FIGS. 9 and 10 are front views showing a second embodiment of a portable terminal 300 having the sliding module 100. The portable terminal 300 includes a first housing 301 having a display unit 311 and a receiver unit 313, and a second housing 302 having a keypad 321 and a transceiver unit 323. The second housing 302 is coupled with the first housing 301 such that the second housing 302 encloses at least three sides of the first housing 301 including front surface and two opposite sides, and is adapted to expose and cover the display unit 311 by the sliding motions of the second housing 302 against the first housing 301.

The sliding guide 101 of the sliding module 100 is mounted on the inner opposite sides of the second housing 302, and the sliding plate 102 is mounted on opposite sides of the first housing 301 in order to couple the first housing 301 with the second housing 302 in a manner such that they can slide.

In contrast to the first embodiment of the portable terminal 200, the second embodiment of the portable terminal 300 is adapted to expose the display unit 311 by downward movement of the second housing 302. However, since the sliding guide 101 is mounted on the second housing 302 and the sliding plate 102 is mounted on the first housing 301, the operation of the sliding module 100 can be realized similar to that of the portable terminal according to the first embodiment.

The portable terminals described in the first and second embodiments have a structure in which the keypad 211 and the display unit 311, respectively, are exposed according to the upward motion of the sliding plate 102.

With respect to the second embodiment of the portable terminal shown in FIGS. 9 and 10, in the state in which the sliding plate 102 is mounted on the second housing 302 and the sliding guide 101 is mounted on the first housing 301, the display unit 311 may be closed while the sliding plate 102 is positioned on the top of the sliding guide 101.

As mentioned above, the sliding module according to the present invention may successfully employ the semi-automatic opening/closing of the portable terminal by converting the direction of the driving force by means of the sliders cooperating with the guide projections, as well as by forming the guide projections on the sliding guide and the sliding plate, respectively. Thus, users can conveniently manipulate the sliding-type portable terminal. Also, the width of the sliding module can be further reduced without affecting the thickness thereof by installing torsion springs on the lateral sides. Any of a variety types of sliding terminals as well as semi-automatic manipulation may be successfully employed. Furthermore, the conventional sliding module should be constructed with planar structures since the sliding motions are performed along a curve, which require some space for part of the torsion spring's coil. The sliding module according to the present invention provides the possibility of embodying curvilinear structures because the semi-automatic open/close operation can accomplished by linear motions.

While the invention has been shown and described with reference to certain preferred embodiments thereof, it will be understood by those skilled in the art that various changes in form and details may be made therein without departing from the spirit and scope of the invention as defined by the appended claims. For example, the present invention has been explained with respect to the planar-type sliding plate and the sliding guide in detail. However, since components such as a sliding plate, sliders and elastic means move along the moving direction of the sliding plate, a curvilinear-type sliding plate may be successfully employed by constructing the surface of the sliding plate in a curved shape, as well as by constructing the sliders and elastic means which have a shape corresponding to the curved shape of the sliding plate.

What is claimed is:

1. A sliding module for a sliding-type portable terminal, in which a first housing and a second housing are coupled in a manner in which they can slide along a longitudinal direction, the sliding module comprising:

a sliding guide attached to the first housing;

a sliding plate attached to the second housing and slidably engaged with the sliding guide; and first and second sliders interposed between the sliding guide and the sliding plate, oriented to face the first housing away from the second housing and adapted to reciprocate along a direction of movement of the sliding plate by resilient force, wherein a first guiding projection formed on the sliding guide supports the second slider and a second guiding projection formed on the sliding plate supports the first slider in a first position in which the sliding plate slides under the sliding guide, and a third guide projection formed on the sliding guide supports the first slider and a fourth guide projection formed on the sliding plate supports the second slider in a second position in which the sliding plate slides above the sliding guide.

2. A sliding module for a portable terminal as claimed in claim 1, wherein when the sliding plate is slidably engaged with the sliding guide, the first guide projection and the second guide projection are aligned in a straight line along a moving direction of the sliding plate, and the third guide projection and the forth guide projection are aligned in a straight line along the moving direction of the sliding plate.

3. A sliding module for a portable terminal as claimed in claim 1, wherein, in the first position, the first slider is in slidable contact with inner walls of the fourth guide projection, and the second slider is in slidable contact with inner walls of the third guide projection.

4. A sliding module for a portable terminal as claimed in claim 1, wherein, in the second position, the first slider is in slidable contact with inner walls of the first guide projection, and the second slider is in slidable contact with inner walls of the second guide projection.

5. A sliding module for a portable terminal as claimed in claim 1, further comprising:

at least one guide rod which longitudinally extends from either one of the first and second sliders;

guide holes formed on another one of the first and second sliders, through which the guide rods can pass; and compression coil springs wound around an outer periphery of the guide rods, and supported at opposite ends by the first and second sliders, respectively.

6. A sliding module for a portable terminal as claimed in claim 1, further comprising a pair of guide holders clamped at opposite side ends of the sliding guide, respectively, to support the opposite side ends of the sliding plate in a manner such that the sliding guide and the sliding plate can slide along each other.

7. A sliding module for a portable terminal as claimed in claim 1, wherein inner walls of the first guide projection and the fourth guide projection are positioned to face each other, respectively, and inner walls of the second guide projection and the third guide projection are positioned to face each other, respectively.

* * * * *